United States Patent [19]

Lindsay et al.

[11] Patent Number: 4,928,491
[45] Date of Patent: May 29, 1990

[54] FUEL SUPPLY DEVICE FOR SUPPLYING FUEL TO AN ENGINE COMBUSTOR

[75] Inventors: Mitchell H. Lindsay, Palm City; Walter B. Kerr, W. Palm Beach, both of Fla.

[73] Assignee: United States of America as represented by the Secretary of Air Force, Washington, D.C.

[21] Appl. No.: 213,198

[22] Filed: Jun. 29, 1988

[51] Int. Cl.⁵ ............................................. F02C 1/00
[52] U.S. Cl. ................................. 60/734; 60/39.83; 431/160; 123/531
[58] Field of Search ............... 60/734, 261, 741, 264, 60/39.83; 431/160; 123/531, 533, 41.31

[56] References Cited

U.S. PATENT DOCUMENTS

| | | | |
|---|---|---|---|
| 1,279,775 | 9/1918 | Sprado | 123/531 |
| 2,264,914 | 12/1941 | Orange | 123/41.31 |
| 2,775,484 | 12/1956 | Fox | 60/741 |
| 2,791,186 | 5/1957 | Alden | 123/41.31 |
| 2,901,185 | 8/1959 | Dickey | 60/741 |
| 2,921,746 | 1/1960 | Burman | 60/741 |
| 2,975,589 | 3/1961 | Vdoviak | 60/261 |
| 2,978,870 | 4/1961 | Vdoviak | 60/741 |
| 3,285,233 | 11/1966 | Jackson | 123/531 |
| 3,391,541 | 7/1968 | Tyler | 60/235 |
| 3,552,123 | 1/1971 | Anschulz et al. | 60/261 |
| 3,648,460 | 3/1972 | Johnson et al. | 60/261 |
| 3,664,124 | 5/1972 | Fehler | 60/741 |
| 3,695,037 | 10/1972 | Alverani | 60/741 |
| 3,733,825 | 5/1973 | Arnett | 60/235 |
| 4,368,714 | 1/1983 | Emmenthal et al. | 123/531 |
| 4,465,050 | 8/1984 | Igashira et al. | 123/533 |
| 4,545,354 | 10/1985 | Jaggle et al. | 123/531 |
| 4,569,202 | 2/1986 | Mouton | 60/734 |
| 4,760,696 | 8/1988 | Rooks et al. | 60/734 |

FOREIGN PATENT DOCUMENTS 2086482 5/1982 United Kingdom ................. 60/734

*Primary Examiner*—Louis J. Casaregola
*Assistant Examiner*—Timothy S. Thorpe
*Attorney, Agent, or Firm*—Robert L. Nathans; Donald J. Singer

[57] ABSTRACT

A fuel metering device of simple design is provided, utilizing a unique cooling air supply mechanism for cooling the feul supply spraybar and fuel metering valve of an aircraft or afterburner, such a mechanism also functioning as a piston position control agent, which in turn controls the fuel supply rate of fuel injected into the combustor. The spraybar is filled with fuel under pressure at all times, and a leaky sleeve prevents potential coking fuel due to the high combustor temperatures. Additionally, the piston for actuating the fuel metering valve requires no gasket, as cooling air is passed about its periphery, and a pair of cooling air supply valves control the pressure differential across the opposite faces of the piston to in turn selectively position the pintle of the fuel injection valve to change the flow rate of fuel into the combustor.

13 Claims, 1 Drawing Sheet

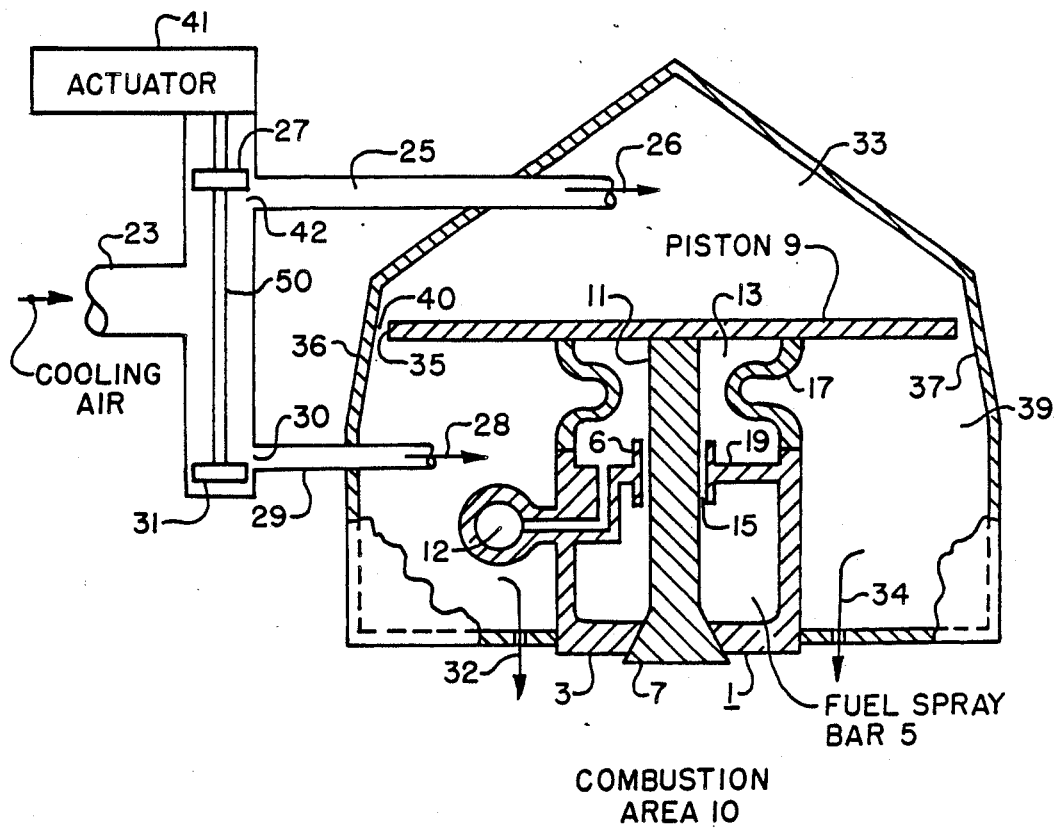

FUEL SUPPLY DEVICE FOR SUPPLYING FUEL TO AN ENGINE COMBUSTOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of aircraft combustor or afterburner fuel supply devices.

The art teaches a number of relatively complex systems for supplying fuel at varying rates to the fuel metering portion of a combustor. It is deemed desirable to provide a variable flow rate fuel supply device having a relatively simple design which could be somewhat more durable than prior art designs. A spraybar is filled with fuel and thus supplies a metering valve with aircraft fuel. It is desirable to eliminate or reduce the time required to fill the spraybar volume and thus alleviate over or under fueling of the combustor. An unduly high flow rate of fuel into the combustor causes "hard" overpressure and unduly low fuel rate results in "blowouts" of a combustor or afterburner with subsequent "hard" relights. It is also desirable to provide for enhanced cooling of the fuel injection spraybar during actuation of the afterburner.

SUMMARY OF THE INVENTION

In accordance with the present invention, a fuel metering device of simple design is provided, utilizing a unique cooling air supply mechanism for cooling the fuel supply spraybar and fuel metering valve of a combustor or afterburner, such a mechanism also functioning as a piston position control agent, which in turn controls the fuel supply rate of fuel injected into the combustor. The spraybar is filled with fuel under pressure at all times, and a leaky sleeve prevents potential coking of fuel due to the high combustor temperatures. Additionally the piston for actuating the fuel metering valve requires no gasket, as cooling air is passed about its periphery. Preferably a pair of cooling air supply valves control the pressure differential across the opposite faces of the piston to in turn selectively position the pintle of the fuel injection valve to change the flow rate of fuel into the combustor.

Other objects, features and advantages of the present invention will become apparent upon study of the following detailed description taken in conjunction with the sole figure.

BRIEF DESCRIPTION OF THE DRAWING

The sole FIGURE illustrates the preferred embodiment of this invention in partial cross section.

DETAILED DESCRIPTION OF A PREFERRED EMBODIMENT

Referring now to the sole FIGURE, fuel metering device 1 is illustrated, having a first fuel chamber or fuel spraybar 5 filled at all times with fuel supplied by a pump (not shown). The metering device comprises a pintle valve member 7 having an elongated coupling member 11 for rigidly coupling the terminal portion of the pintle valve to piston 9 as illustrated. The elongated coupling member 11 is fitted with a cylindrical orifice or sleeve 6 and fuel under relatively high pressure passes through the space 15 between the elongated coupling member 11 and sleeve 6, to be slowly drained through a second fuel chamber 13 and through a drain 12. As the fuel metering valve will often be closed so that no fuel passes from spraybar 5 into the combustor area 10, the drainage of fuel through leaky sleeve 6 aids in preventing coking of fuel due to the elevated temperatures of the engine burner even though the burner is not in operation. A corrugated wall 17 which could be of a resilient springy metal, could spring bias piston 9 upwardly during periods when the pintle 7 holds the metering valve closed. A cooling fluid supply device comprises a cooling air inlet 23 which causes air to pass through upper conduit 25 and lower conduit 29, to emerge into a first upper cooling air chamber 33 as indicated by arrow 26 and to emerge into a second lower cooling air chamber 39 as indicated by arrow 28.

It is a feature of the present invention to provide a space between sloping wall portion 36 and the left hand peripheral portion 35 of piston 9, and a similar space between the right hand peripheral portion of piston 9 and the right hand sloping wall portion at 37. Of course the piston is circular and thus an annular gap 40 is provided between the outer most rim of piston 9 and the sloping sides of the annular cooling air supply chambers.

Now let it be assumed that fuel is to be injected into the combustor area. Cooling air supply actuator 41 causes valve stem 50 to be raised so that valve member 27 opens inlet 42 while at the same time valve member 31 further restricts the inlet 30 between inlet pipe 23 and the second lower cooling air chamber. As a result, the static pressure within the first or upper cooling air chambers 33 will increase while the static pressure within the second or lower cooling air chamber 39 will decrease. This pressure differential will cause pintle valve 7 to open to cause fuel to be injected into the combustor area from fuel spraybar 5 because piston 9 and coupling means 11 moves downwardly in a first direction.

It is an important feature of the invention that cooling air will also pass between the outer piston peripheral portions at 35, and the sloping wall portions so that as the pintle valve remains open, cooling air will flow throughout the entire device and be discharged at portions 32 and 34. Thus actuator 41 is able to closely control the static pressure differential across piston 9, which in turn controls the size of the gap between pintle 7 and the surrounding valve seat at 3.

When the injection of fuel is to cease, actuator 41 causes inlet 42 to be substantially blocked while increasing the area of inlet 30 to thereby cause the static pressure in the lower cooling air supply chamber 39 to be increased relative the static pressure within the upper cooling air chamber 33 and thus the piston is moved upwardly in a second direction opposite said first direction to cause pintle 7 to be completely seated and fuel is shut-off. By adjusting the relative effective inlet cross sectional areas of cooling air supply conduits 25 and 29, intermediate positions of the pintle valve may be attained while cooling air is continuously delivered between the upper cooling air chamber 33 and the lower cooling air chamber 39.

The leaky sleeve 6 within the horizontal wall barrier 19, separating the high pressure chamber or spray bar 5 from the lower pressure fuel chamber 13, also functions to maintain proper alignment of the elongated coupling device 11 for coupling the pintle valve head 7 to piston 9. While the wall portions 36 and 37 need not be sloping, it is preferable to cause the annular gap between the piston periphery at 35 to increase as the metering valve continues to open due to the wall sloping thereby to enhance the flow rate of cooling air through the metering device, since higher fuel flow rates will tend to increase the temperature of the metering device. The piston periphery air gap also functions to eliminate the need for a piston gasket.

While a preferred embodiment has been described, numerous variations may be made of the components of the metering device within the scope of the present invention and thus the invention is to be limited only by the language of the following claims and art recognition equivalence thereof. The term cooling fluid used in the claims would normally be air but it is conceivable that under special circumstances such cooling fluid could be a liquid.

What is claimed is:

1. A variable flow rate fuel supply device for supplying fuel to an engine combustor (10) comprising:
   (a) fuel metering means (1) having a fuel valve means (3, 7) for controlling the flow rate of fuel to said combustor;
   (b) piston means (9) for dividing a first cooling fluid chamber (33) from a second cooling fluid chamber (39);
   (c) coupling means (11) for coupling said piston means to said fuel valve means (3, 7); and
   (d) cooling fluid supply means (23, 25, 29, 41, 42, 50, 27, 31, 30) in communication with said first and second cooling fluid chamber for producing a first pressure differential across said piston means (9) for actuating said fuel valve means in a first direction, and for producing a second pressure differential across said piston means for actuating said valve means in a second direction opposite said first direction, to control the flow rate of said fuel through said fuel metering means and into said engine combustor; and
   (e) means for positioning (12) said fuel metering means (1) within said second cooling air chamber (39), enabling said cooling air supply means to both cool said fuel metering means and control the fuel supply rate of fuel supplied by said fuel metering means to said combustor.

2. The fuel supply device of claim 1 including a first fuel chamber (5) filled with fuel at all times, having said fuel valve means (3, 7) mounted thereon.

3. The fuel supply device of claim 2 further including a second fuel chamber (13) separated from said first fuel chamber (5) by a barrier wall member (19) having an orifice (15) therein for receiving said coupling means (11) and for providing drainage of said fuel from said first fuel chamber into second fuel chamber, thereby to prevent coking of fuel.

4. The fuel supply device of claim 3 wherein said second fuel chamber includes a corrugated wall member (17) coupled to said piston means.

5. The fuel supply device of claim 3 wherein said orifice is surrounded by a leaky sleeve.

6. The fuel supply device of claim 4 wherein said corrugated wall member comprises a resilient spring member (17) for mechanically biasing said piston means.

7. The fuel supply device of claim 5 wherein said corrugated wall member comprises a resilient spring member for mechanically biasing said piston means.

8. The fuel supply device of claim 1 wherein said cooling fluid supply means includes cooling fluid valve means (41, 27, 50, 31) for increasing the static fluid pressure within said first cooling fluid chamber while reducing the static fluid pressure within said second cooling fluid chamber, to increase the flow rate of said fuel to said combustor.

9. The fuel supply device of claim 2 wherein said cooling fluid supply means includes cooling fluid valve means for increasing the static fluid pressure within said first cooling fluid chamber while reducing the static fluid pressure within said second cooling fluid chamber, to increase the flow rate of said fuel to said combustor.

10. The fuel supply device of claim 6 wherein said cooling fluid supply means includes cooling fluid valve means for increasing the fluid pressure within said first cooling fluid chamber while reducing the fluid pressure within said second cooling fluid chamber, to increase the flow rate of said fuel to said combustor.

11. The fuel supply device of claim 1 wherein peripheral portions (35) of said piston means (9) are positioned adjacent but separated from sloping wall portions (36, 37) of said first and second cooling fluid chamber to define a variable gap (40) for increasing the flow rate of cooling fluid from said first cooling fluid chamber to said second cooling fluid chamber as said fuel valve means opens.

12. The fuel supply device of claim 8 wherein peripheral portions of said piston means are positioned adjacent but separated from sloping wall portions of said first and second cooling fluid chamber to define a variable gap for increasing the flow rate of cooling fluid from said first cooling fluid chamber to said second cooling fluid chamber as said fuel valve means opens.

13. A variable flow rate fuel supply device for supplying fuel to an engine combustor comprising:
   (a) fuel metering means having movable fuel valve means for controlling the flow rate of fuel to said engine combustor;
   (b) piston means for dividing a first cooling fluid chamber from a second cooling fluid chamber, said piston means being separated from wall portions of said first and second cooling chamber by an annular gap permitting cooling air to flow therethrough;
   (c) coupling means for coupling said piston means to said movable valve means;
   (d) cooling fluid supply means in communication with said first and second cooling fluid chamber, for producing a first pressure differential across said piston means for actuating said fuel valve means in a first direction, and for producing a second pressure differential across said piston means for actuating said fuel valve means in a second direction opposite said first direction; and
   (e) means for positioning said fuel metering means within said second cooling fluid chamber, enabling said cooling fluid supply means to both cool said fuel metering means and control the fuel supply rate of fuel supplied by said fuel metering means to said combustor.

* * * * *